United States Patent
Kim et al.

(10) Patent No.: US 11,488,580 B2
(45) Date of Patent: Nov. 1, 2022

(54) DIALOGUE SYSTEM AND DIALOGUE PROCESSING METHOD

(71) Applicants: HYUNDAI MOTOR COMPANY, Seoul (KR); KIA MOTORS CORPORATION, Seoul (KR)

(72) Inventors: Seona Kim, Seoul (KR); Jeong-Eom Lee, Yongin-si (KR); Dongsoo Shin, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 127 days.

(21) Appl. No.: 16/682,758

(22) Filed: Nov. 13, 2019

(65) Prior Publication Data

US 2020/0320981 A1 Oct. 8, 2020

(30) Foreign Application Priority Data

Apr. 3, 2019 (KR) .................. 10-2019-0039267

(51) Int. Cl.
*G10L 15/06* (2013.01)
*G10L 15/22* (2006.01)
*G10L 15/07* (2013.01)

(52) U.S. Cl.
CPC ............ *G10L 15/063* (2013.01); *G10L 15/07* (2013.01); *G10L 15/22* (2013.01); *G10L 2015/0635* (2013.01); *G10L 2015/0638* (2013.01); *G10L 2015/223* (2013.01); *G10L 2015/228* (2013.01)

(58) Field of Classification Search
CPC ..... G10L 2015/0635; G10L 2015/0638; G10L 2015/223; G10L 2015/228; G10L 15/063; G10L 15/07; G10L 15/22
See application file for complete search history.

(56) References Cited

U.S. PATENT DOCUMENTS

| | | | | |
|---|---|---|---|---|
| 7,822,610 B2* | 10/2010 | Burns | ................. | G10L 15/22 704/270.1 |
| 7,881,932 B2* | 2/2011 | Muschett | ............. | G06F 40/143 704/270.1 |
| 2004/0111259 A1* | 6/2004 | Miller | .................... | G10L 15/19 704/E15.044 |
| 2008/0059188 A1* | 3/2008 | Konopka | ................ | G10L 15/22 704/E15.04 |
| 2008/0262848 A1* | 10/2008 | Shienbrood | ......... | H04M 3/4936 704/E15.044 |
| 2011/0060587 A1* | 3/2011 | Phillips | ................... | G10L 15/30 704/235 |
| 2012/0173244 A1* | 7/2012 | Kwak | ..................... | G10L 15/22 704/E15.001 |

\* cited by examiner

*Primary Examiner* — Michael Colucci
(74) *Attorney, Agent, or Firm* — McDonnell Boehnen Hulbert & Berghoff LLP

(57) ABSTRACT

It is an aspect of the present disclosure to provide a dialogue system capable of providing an extended function to the user by registering a new vocabulary that matches the user's preference and by changing the pre-stored conversation pattern.

12 Claims, 9 Drawing Sheets

FIG. 3
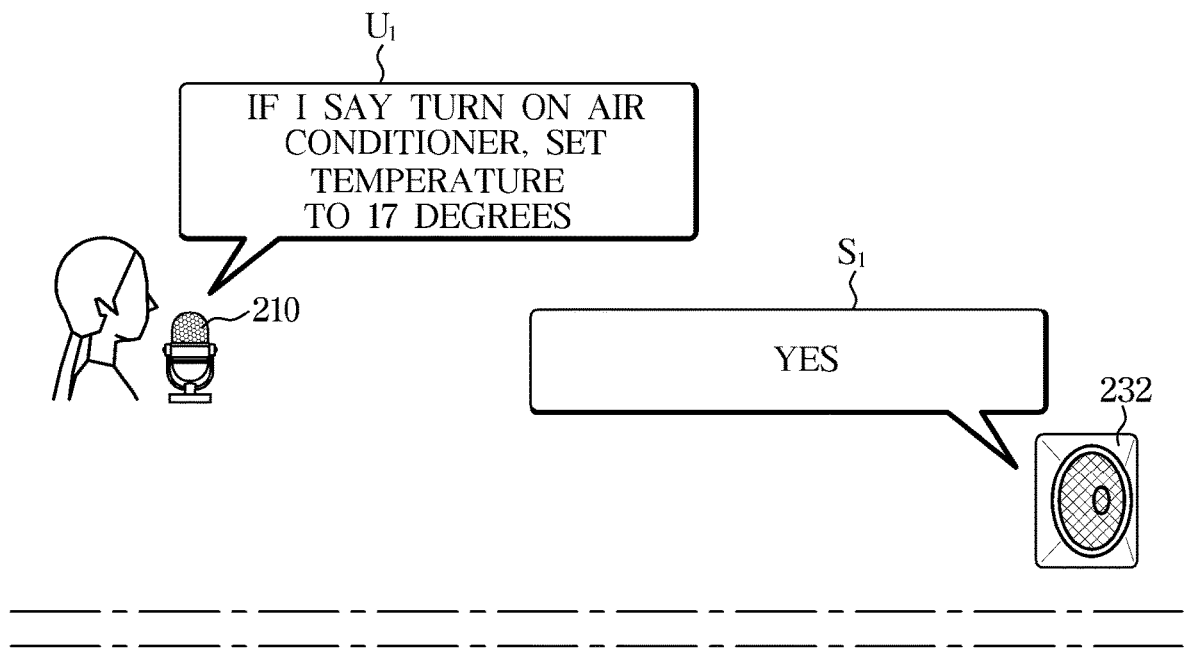
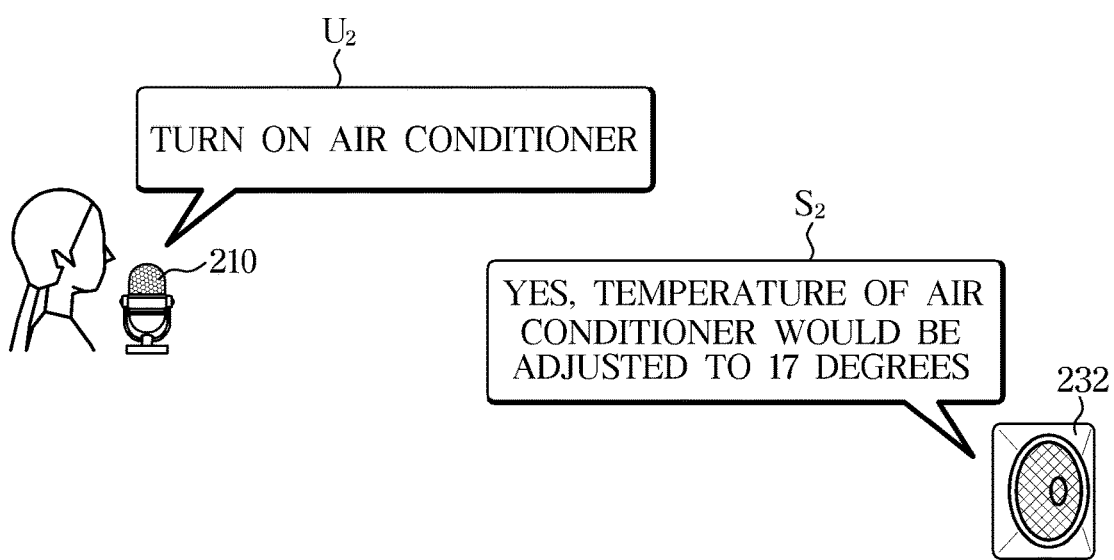

DIALOGUE SYSTEM AND DIALOGUE PROCESSING METHOD

CROSS-REFERENCE TO RELATED APPLICATION

This application claims the benefit of Korean Patent Application No. 10-2019-0039267, filed on Apr. 3, 2019, the disclosure of which is incorporated herein by reference.

BACKGROUND

1. Technical Field

Embodiments of the disclosure relate to a dialogue system configured to grasp an intention of a user through communication with the user and provide the user with necessary information or services.

2. Description of the Related Art

As for an audio-video-navigation (AVN) device of a vehicle or most mobile devices, when providing visual information to a user or receiving a user input, a small screen and a small button provided therein may cause the user inconvenience. Particularly, during driving, when the user takes his or her hand off of a steering wheel, or when the user looks up at another location for checking the visual information and operating devices, it may be a serious threat to safe driving.

Therefore, when applying a dialogue system to the vehicle, it may be possible to provide services in a more convenient and safer manner, wherein the dialogue system is capable of recognizing the user's intention through dialogue with the user and providing information or services necessary for the user.

Meanwhile, in ordinary dialogue systems, it was difficult for the user to add or change new vocabulary in addition to the predetermined vocabulary. Also, adding or changing the new vocabulary by the user could cause conflict with an existing system.

SUMMARY

Therefore, it is an aspect of the present disclosure to provide a dialogue system capable of providing an extended function to a user by registering new vocabulary that matches the user's preferences and by changing a pre-stored conversation pattern.

In accordance with one aspect of the present disclosure, a dialogue system may include a storage configured to store information related to an action; an input processor configured to receive a user's utterance and extract the action related to a user rule from the user's utterance; a rule determiner configured to determine whether the action transmitted by the input processor is applicable and analyze a parameter included in the action and determine an update of the storage based on the determination; and a rule manager configured to update the storage based on the determination of the rule determination processor.

The rule determiner determines whether a ground rule previously stored in the storage and the user rule collide with each other.

The rule determiner determines whether the user rule is applicable based on at least one of context information or a dialogue policy included in the storage.

The rule determiner determines the update of the storage based on a determination result of a collision and a determination result of the applicability.

The rule manager adds the action or the parameter to the storage.

The rule manager changes the information previously stored in the storage into the action or the parameter.

The rule manager registers a synonym or an antonym related with the parameter to the storage based on a dialogue policy.

The rule determiner determines whether the action is applicable to other actions stored in the storage.

The rule manager adds a command for a service related to the user rule based on the determination of the rule determiner.

The dialogue system further includes a response generation manager configured to generate a response to the user's utterance based on a determination result of whether the action is applicable.

In accordance with one aspect of the present disclosure, a controlling method of a dialogue system may include storing information related to an action; extracting the action related to a user rule from the user's utterance after receiving a user's utterance; determining whether the action transmitted by an input processor is applicable; determining an update of the storage based on the determination after analyzing a parameter included in the action; and managing the information related to the action based on the determination.

The determining includes determining whether a ground rule previously stored in the storage and the user rule collide with each other.

The determining includes determining whether the user rule is applicable based on at least one of context information or a dialogue policy.

The determining the update includes determining the update of a storage based on a determination result of a collision and a determination result of the applicability.

The managing includes adding the action or the parameter to a storage.

The managing includes changing the information previously stored in a storage into the action or the parameter.

The managing includes registering a synonym or an antonym related with the parameter to the storage based on a dialogue policy The determining includes determining whether the action is applicable to other actions stored in a storage.

The managing includes adding a command for a service related to the user rule.

The controlling method of the dialogue system may further include generating a response to the user's utterance based on a determination result of whether the action is applicable.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a control block diagram illustrating a dialogue system in accordance with an embodiment of the present disclosure;

FIG. 2 is a view illustrating an interior of a vehicle;

FIG. 3 is a view illustrating an example of dialogue that is generated between a dialogue system and a driver;

FIG. 4 is a control block diagram illustrating a configuration of an input processor in detail;

DETAILED DESCRIPTION

Figure 1:
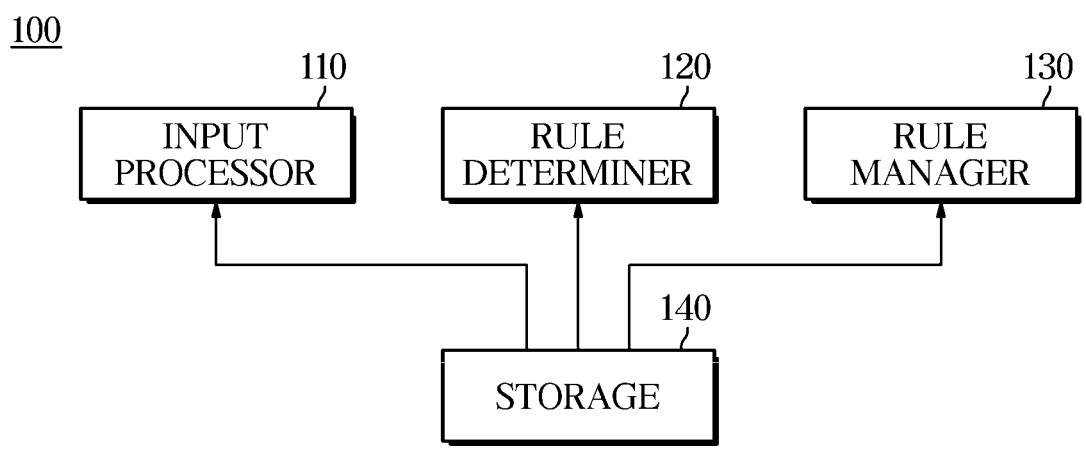

In the following description, like reference numerals refer to like elements throughout the specification. Well-known functions or constructions are not described in detail since they would obscure the one or more exemplar embodiments with unnecessary detail. Terms such as "unit," "module," "member," and "block" may be embodied as hardware or software. According to embodiments, a plurality of "units," "modules," "members," and "blocks" may be implemented as a single component or a single "unit," "module," "member," and "block" may include a plurality of components.

It will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

Reference will now be made in detail to embodiments of the present disclosure, examples of which are illustrated in the accompanying drawings.

According to an embodiment, a dialogue system may be configured to recognize a user's intention by using the user's utterance and another input except for speech, and configured to provide a service, which is appropriate or needed, for the user's intention. The dialogue system may perform a dialogue with the user by outputting a system utterance that is one tool configured to provide a service or to clearly recognize the user's intention.

According to embodiments, the service provided to the user may include all types of operations in accordance with the user's need or the user's intention, wherein the all types of operations may include providing information, controlling a vehicle, performing audio/video/navigation functions, and providing content from an external server.

According to an embodiment, the dialogue system provides a dialogue processing technology specialized for the vehicle environment so as to recognize the user's intention precisely in a special environment, i.e. a vehicle.

A gateway connecting the dialogue system to the user may be a vehicle or a mobile device connected to the vehicle. As mentioned below, the dialogue system may be provided in the vehicle or a remote server outside of the vehicle so as to send or receive data through communication with the vehicle or the mobile device connected to the vehicle.

Some components in the dialogue system may be provided in the vehicle and some thereof may be provided in the remote server. Therefore, the vehicle and the remote server may perform a part of the operation of the dialogue system.

FIG. 1 is a control block diagram illustrating a dialogue system in accordance with an embodiment of the present disclosure.

Referring to FIG. 1, a dialogue system 100 may include an input processor 110 processing a user input including a user's utterance and an input except for the user's speech, or an input including information related to a vehicle or information related to the user, a rule determiner 120 recognizing the user's intention using a result of the process of the input processor 110 and determining whether a new rule to be created or changed by the user is applicable, a rule manager 130 generating a user rule to be applied and updating the system to apply the generated user rule, and a storage 140 storing various information necessary for the dialogue system 100 to perform an operation described below.

In this embodiment, the user rule is a rule that the user wants to create in addition to a rule (a ground rule) stored in advance at the time of manufacture of the dialogue system 100, which is an example of an action. The action may represent all types of actions for providing a certain service and may be performed after grasping the intention of the user. The types of the actions may be determined in advance. As needed, providing a service may correspond to performing the action. Therefore, the user rule refers to the service itself, which allows the user to change a dialogue pattern established by the system. Detailed description of the action will be described later with reference to other drawings.

The input processor 110 may receive two types of inputs including the user's speech and an input except for the speech. The input except for the speech may include recognizing the user's gesture, an input except for the user's utterance received by an input device, vehicle state information indicating a vehicle state, driving environment information related to driving information of the vehicle and user information indicating the user's state.

In the following description, a method of generating or changing the user rule after the input processor 110 receives the user's explicit voice input will be described. However the disclosed embodiments are not necessarily limited to explicit input due to the user's voice.

The input processor 110 converts the user's utterance into an utterance in a text type by recognizing the user's utterance, and recognizes the user's intention by applying a natural language understanding algorithm to the user's utterance. In the disclosed embodiment, the input processor 110 determines the user's intention, which is the user rule, through natural language understanding, and then transmits specific information about the user's utterance and the user rule to a rule determiner 120.

The rule determiner 120 receives the user's intention, that is, the user rule transmitted from the input processor 110, and determines whether a conflict with the ground rule may occur. The rule determiner 120 also determines whether a condition entered by the user and the result can be performed by the dialogue system 100.

When it is determined that the user rule can be created or changed, the rule determiner 120 requests a new update about the user rule from the rule manager 130.

The rule manager 130 is an example of a result processor performed by the dialogue system 100.

The rule manager 130 generates and outputs a dialogue response and a command that is needed to perform the transmitted action. The dialogue response may be output in a text, image or audio type. When the command is output, a service such as vehicle control and external content provision, corresponding to the output command, may be performed.

When the result of determining that the user rule is executable is transmitted from the rule determiner 120, the rule manager 130 stores a condition parameter, a result parameter, and a reference parameter in the storage 140, and updates services such as generating a response, editing a service, generating a command and changing an external service.

The storage 140 stores various types of information necessary for the above-described operation. For example, the storage 140 may store information necessary for a domain/action inference, store context information necessary for determining whether the user rule can be applied, and store information on the applicable user rule, and provides storage space for long-term storage.

The storage 140 includes a domain/action inference rule DB 141, a context information DB 142, a long-term memory 143, a short-term memory 144, a dialogue policy DB 145, a response template 146, and an external service set DB 147. The storage stores information required for an operation performed by the dialogue system 100. A detailed description of the various types of information stored by the storage 140 will be described later with reference to other drawings below.

Figure 2:
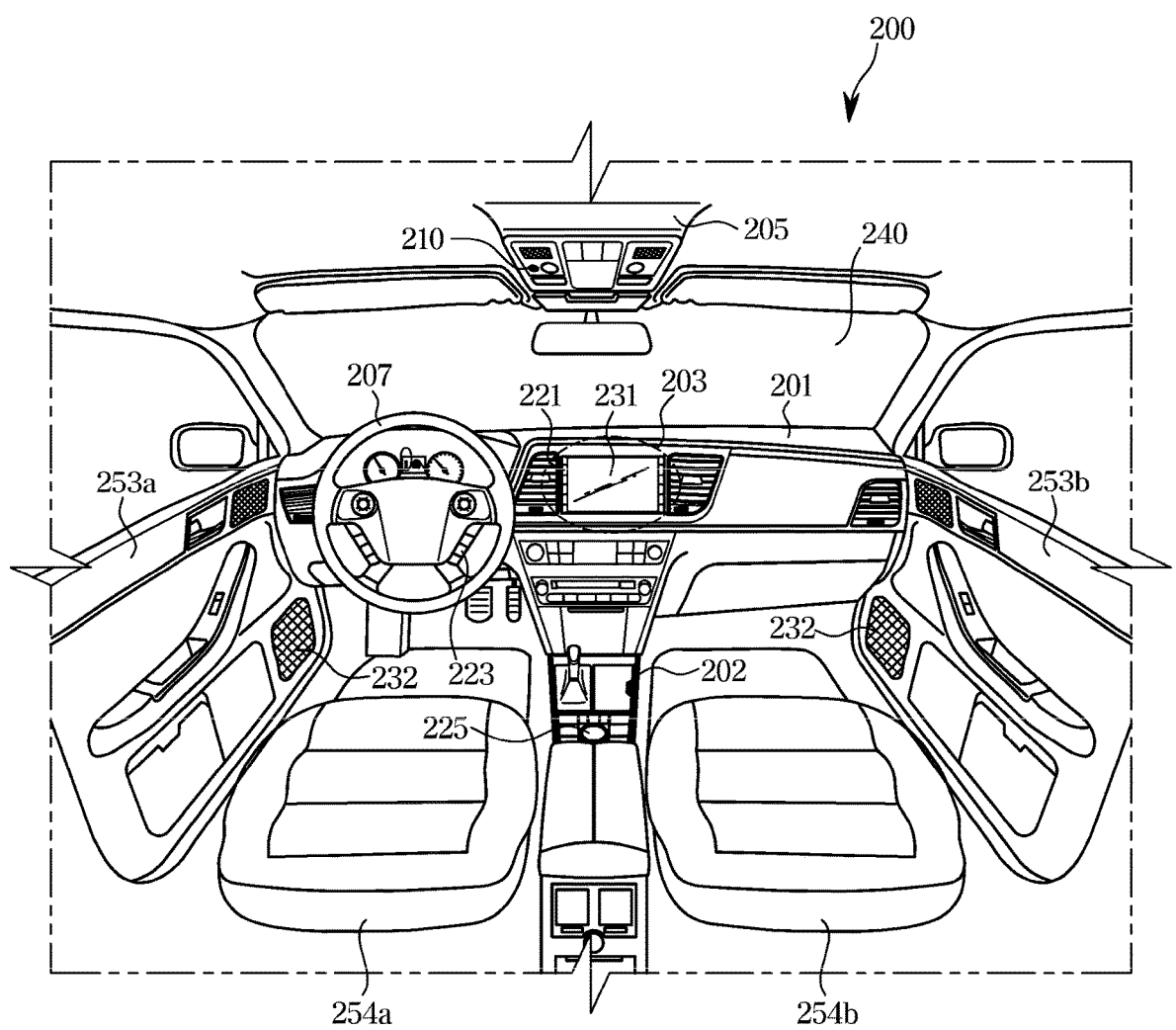

FIG. 2 is a view illustrating an interior of a vehicle.

Referring to FIG. 2, a vehicle 200 may include a dashboard 201 and a center fascia 203 corresponding to a center portion of the dashboard.

A display 231 configured to display a screen required for the control of the vehicle including an audio function, a video function, a navigation function, and a calling function, and an input button 221 configured to receive the user's control command may be provided in the center fascia 203.

For the user's operation convenience, an input button may be provided in a steering wheel 207 and a jog shuttle 225 acting as the input button may be provided in a center console region 202 provided between a driver's seat 254a and a passenger seat 254b.

The display 231 may be implemented as any one of various display devices, e.g., Liquid Crystal Display (LCD), Light Emitting Diode (LED), Plasma Display Panel (PDP), Organic Light Emitting Diode (OLED), and Cathode Ray Tube (CRT).

The input button 221 may be provided in a hard key type on an area adjacent to the display 231, as illustrated in FIG. 2. Alternatively, when the display 231 is implemented as a touch screen, the display 231 may perform a function of the input button 221.

The vehicle 200 may receive the user control command as speech via a speech input device 210. The speech input device 210 may include a microphone configured to receive sound and then covert the sound into an electrical signal.

For effective speech input, the speech input device 210 may be mounted to a head lining 205, as illustrated in FIG. 2, but an embodiment of the vehicle 200 is not limited thereto. Therefore, the speech input device 210 may be mounted to the dashboard 201 or the steering wheel 207. In addition, the speech input device 210 may be mounted to any position as long as the position is appropriate for receiving the user's utterance.

In the inside of the vehicle 200, a speaker 232 configured to perform dialogue with the user or configured to output a sound required to provide the service desired by the user may be provided. For example, the speaker 232 may be provided inside of a driver's seat door 253a and a passenger seat door 253b.

The speaker 232 may output speech for navigation route guidance, sound or speech contained in audio and video contents, speech for providing information or service desired by the user, and a system utterance generated as a response to the user's utterance.

According to an embodiment, the dialogue system 100 provides a service that is appropriate for the user's lifestyle by using the dialogue processing technologies appropriate for the vehicle environment, and the dialogue system 100 may implement a new service using technologies such as connected car, Internet of Things (IoT), and artificial intelligence (AI).

When applying the dialogue processing technologies appropriate for the vehicle environment, such as the dialogue system 100 according to an embodiment, it may be easy to recognize and respond to key context while a driver directly drives the vehicle. It may be possible to provide a service by applying a weight to a parameter affecting the driving, such as low fuel and drowsy driving, or it may be possible to easily obtain information, e.g., a driving time and destination information, which is needed for the service, based on a condition in which the vehicle moves to the destination in most cases.

In addition, it may be possible to easily implement intelligent services configured to provide a function by recognizing the driver's intention. This is because priority is given to real-time information and the action in the driver's direct driving situation. For example, when the driver searches for a gasoline station while driving, it may be interpreted as an intention that the driver will go to the gasoline station. But, when the driver searches for the gasoline station at the location and not in the vehicle, it may be interpreted as another intention, such as searching for location information inquiry, phone number inquiry and price inquiry other than the intention that the driver will go to the gasoline station.

Further, although the vehicle is a limited space, various situations may occur therein. For example, the driver may utilize the dialogue system 100 in a variety of situations, e.g., driving a vehicle having an unfamiliar interface, such as a rental car or using a chauffeur service, a vehicle management situation such as washing the vehicle, a situation in which a baby is on board, and a situation of visiting a certain destination FIG. 3 is a view illustrating an example of dialogue that is generated between a dialogue system and a driver.

Referring to FIG. 3, the driver may request that the disclosed dialogue system 100 creates or changes the user rule that matches his or her preference or taste. The dialogue system 100 may output an utterance responding to the driver's request through the speaker 232.

Specifically, the driver may input an utterance asking for a change of the predetermined ground rule ($U_1$: If I say turn on the air conditioner, set the temperature to 17 degrees), the dialogue system 100 determines whether the request is applicable, and then the dialogue system 100 may output an utterance accepting the driver's request ($S_1$: Yes).

After some time, the driver may input an utterance corresponding to the conditions of the user rule previously applied to the dialogue system 100 ($U_2$: Turn on the air conditioner), and the dialogue system 100 may output an utterance providing information of the service to be adjusted to 17 degrees according to the updated user rule (S$_2$: Yes, the temperature of the air conditioner will be adjusted to 17 degrees).

The dialogue system 100 may apply a new rule set by the user through the input processor 110 and perform an update. In addition, in the next conversation, the dialogue system 100 may perform a conversation with the user through the updated rules.

Figure 4:
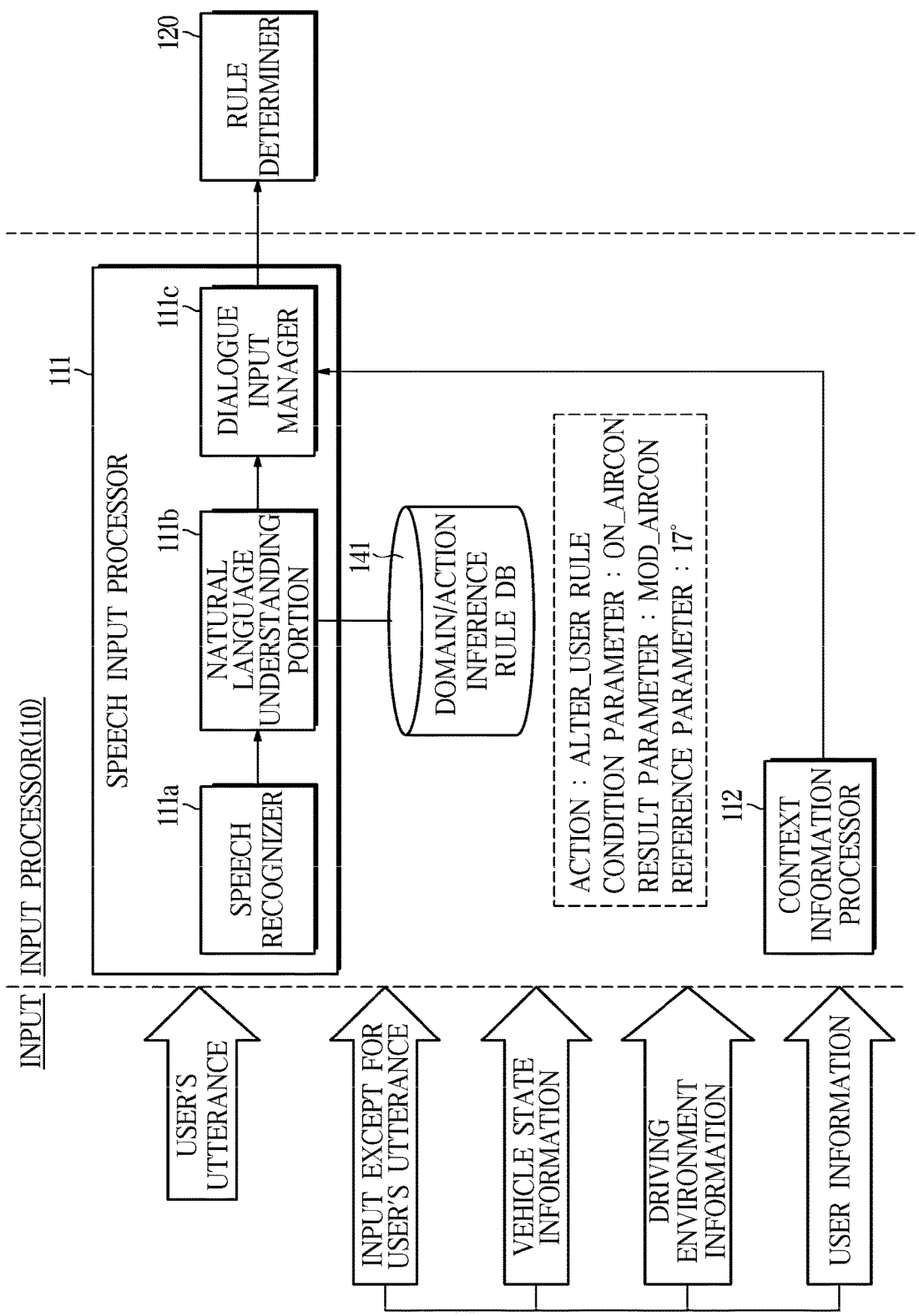
Figure 5:
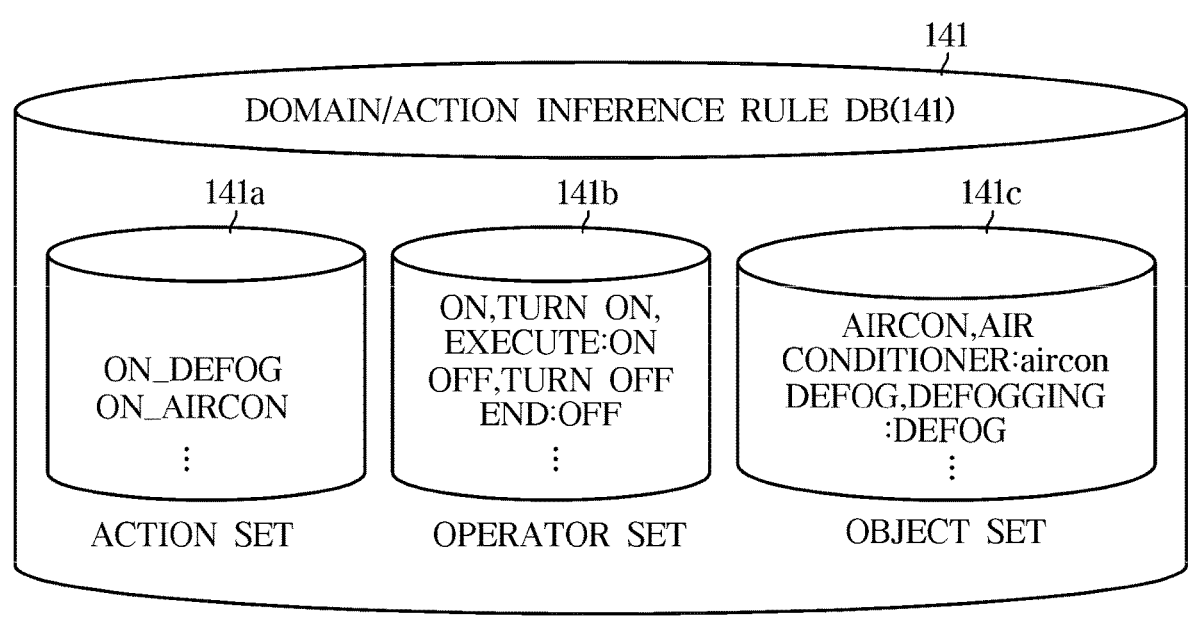
FIG. 5 is a diagram illustrating a domain/action inference rule DB (database) corresponding to an example of a storage.

FIG. 4 is a control block diagram illustrating a configuration of an input processor in detail, and FIG. 5 is a diagram illustrating a domain/action inference rule DB (database) corresponding to an example of a storage.

Referring to FIG. 4, the input processor 110 may include a speech input processor 111 processing the speech input and a context information processor 112 processing the context information.

The user's utterance transmitted from the speech input device 210 may be input to the speech input processor 111, and the input except for the user's utterance transmitted from the information from the speech input device 220 may be input to the context information processor 112. The input except for the speech may be contained in the context information. That is, the context information may include the vehicle state information, the driving environment information and the user information.

The vehicle state information may include information, which indicates the vehicle state and is acquired by a sensor provided in the vehicle 200, and information that is related to the vehicle, e.g., fuel type of the vehicle, and stored in the vehicle.

The driving environment information may be information acquired by a sensor provided in the vehicle 200. The driving environment information may include image information acquired by a front camera, a rear camera or a stereo camera, obstacle information acquired by a sensor, e.g., a radar, a Lidar, or an ultrasonic sensor, and information related to an amount of rain and rain speed information acquired by a rain sensor.

The driving environment information may further include traffic state information, traffic light information, and adjacent vehicle access or adjacent vehicle collision risk information, which is acquired via a V2X.

The user information may include information related to the user's state that is measured by a camera provided in the vehicle or a biometric reader, information related to the user that is directly input using an input device provided in the vehicle by the user, information related to the user and stored in an external content server, and information stored in a mobile device connected to the vehicle.

The speech input processor 111 may include a speech recognizer 111a outputting an utterance in the text type by recognizing the received user's utterance, a natural language understanding portion 111b identifying the user's intention contained in the utterance by applying natural language understanding technology to the user's utterance, and a dialogue input manager 111c transmitting a result of the natural language understanding and the context information, to the rule determiner 120.

The speech recognizer 111a may include a speech recognition engine and the speech recognition engine may recognize speech uttered by the user by applying a speech recognition algorithm to the input speech and generate a recognition result. Since the input speech is converted into a more useful form for the speech recognition, the speech recognizer 111a may detect an actual speech section included in the speech by detecting a start point and an end point from a speech signal. This is called End Point Detection (EPD). The speech recognizer 111a may extract a feature vector of the input speech from the detected section by applying a feature vector extraction technique, e.g., Cepstrum, Linear Predictive Coefficient: (LPC), Mel Frequency Cepstral Coefficient (MFCC) or Filter Bank Energy.

The speech recognizer 111a may acquire the results of recognition by comparing the extracted feature vector with a trained reference pattern. At this time, the speech recognizer 111a may use an acoustic model of modeling and compare the signal features of the speech, and a language model of modeling a linguistic order relationship of a word or a syllable corresponding to recognition vocabulary. For this, the storage 140 may store an acoustic model and language model DB.

The acoustic model may be classified into a direct comparison method of setting a recognition target to a feature vector model and comparing the feature vector model to the feature vector of the speech signal, and a statistical method of statistically processing the feature vector of the recognition target.

The direct comparison method is setting a unit, such as a word or a phoneme, which is the recognition target, to the feature vector model, and comparing the received speech to the feature vector model to determine similarity between them. A representative example of the direct comparison method is vector quantization. The vector quantization is mapping the feature vectors of the received speech signal to a codebook that is a reference model to code the results of the mapping to representative values, and comparing the representative values to each other.

The statistical model method is configuring units of the recognition target as state sequences and using a relationship between the state sequences. Each state sequence may be configured with a plurality of nodes. The method of using the relationship between the state sequences can be classified into Dynamic Time Warping (DTW), Hidden Markov Model (HMM), and a method of using a neural network.

The DTW is a method of compensating for differences in the time axis through comparison to the reference model in consideration of the dynamic feature of speech that the length of a signal varies over time even when the same person utters the same pronunciation. The HMM is a recognition method of assuming speech as a Markov process having state transition probability and observation probability of nodes (output symbols) in each state, then estimating the state transition probability and the observation probability of nodes based on learning data, and calculating probability at which the received speech is to be generated from an estimated model.

Meanwhile, the language model of modeling the linguistic order relationship of a word, a syllable, etc. may reduce acoustic ambiguity and recognition errors by applying an order relation between units configuring a language to units acquired through speech recognition. The language model may include a statistical language model, and a model based on Finite State Automata (FSA). The statistical language model uses chain probability of a word, such as Unigram, Bigram, and Trigram.

The speech recognizer 111a may use any one of the above-described methods for the speech recognition. For example, the speech recognizer 111a may use the acoustic model to which the HMM is applied, or an N-best search method in which the acoustic model is combined with a speech model. The N-best search method can improve recognition performance by selecting N recognition result candidates or less using the acoustic model and the language model, and then re-estimating an order of the recognition result candidates.

The speech recognizer 111a may calculate a confidence value to ensure reliability of a recognition result. The confidence value may be criteria representing how a speech recognition result is reliable. For example, the confidence value may be defined, with respect to a phoneme or a word that is a recognized result, as a relative value of probability at which the corresponding phoneme or word has been uttered from different phonemes or words. Accordingly, the confidence value may be expressed as a value between 0 and 1 or between 1 and 100.

When the confidence value is greater than a predetermined threshold value, the speech recognizer 111a may output the recognition result to allow an operation corresponding to the recognition result to be performed. When the confidence value is equal to or less than the threshold value, the speech recognizer 111a may reject the recognition result.

The utterance in the form of text that is the recognition result of the speech recognizer 111a may be input to the natural language understanding portion 111b.

The natural language understanding portion 111b may identify an intention of the user's utterance included in an utterance language by applying the natural language understanding technology. Therefore, the user may input a control command through a natural dialogue, and the dialogue system 100 may also induce the input of the control command and provide a service needed by the user via the dialogue.

The natural language understanding portion 111b may perform morphological analysis on the utterance in the form of text. A morpheme is the smallest unit of meaning and represents the smallest semantic element that cannot be subdivided any further. Thus, the morphological analysis is a first step in natural language understanding and transforms an input string into a morpheme string.

The natural language understanding portion 111b may extract a domain from the utterance based on the morphological analysis result. The domain may be used to identify a subject of the user's utterance language, and the domain indicating a variety of subjects, e.g., route guidance, weather search, traffic search, schedule management, fuel management and air conditioning control, may be stored in a database.

The natural language understanding portion 111b may recognize an entity name from the utterance. The entity name may be a proper noun, e.g., people's names, place names, organization names, time, date, and currency, and the entity name recognition may be configured to identify the entity name in a sentence and determine the type of the identified entity name. The natural language understanding portion 111b may extract important keywords from the sentence using the entity name recognition and recognize the meaning of the sentence.

The natural language understanding portion 111b may analyze a speech act contained in the utterance. The speech act analysis may be configured to identify the intention of the user's utterance, e.g., whether the user asks a question, whether the user makes a request, whether the user responses or whether the user simply expresses an emotion.

The natural language understanding portion 111b extracts the action corresponding to the intention of the user's utterance. The natural language understanding portion 111b may identify the intention of the user's utterance based on the information, e.g., the domain, the entity name, and the speech act and extract the action corresponding to the utterance. The action may be defined by an object and an operator.

The natural language understanding portion 111b extracts the action corresponding to the intention of the user's utterance. As described above, the action refers to a variety of services that the dialogue system 100 provides to the user. This action may be pre-stored in the domain/action inference rule DB 141.

Referring to FIG. 5, the action may be defined by an object and an operator. For example, an action of executing a defogger, which is a device for removing frost from a front windshield 240 provided in the vehicle 200, may be defined as "on_defog" by combining "on" corresponding to the operator and "defog" corresponding to the object. As another example, an action of executing the air conditioner provided in the vehicle 200 may be defined as "on_aircon" by combining "on" corresponding to the operator and "aircon" corresponding to the object.

The domain/action inference rule DB 141 may further include an operator set 141b and an object set 141c in which the operator and the object are databased, in addition to an action set 141a in which a pre-defined action is databased.

The operator set 141b may store various morphemes, such as "on," "turn on," and "execute," which can be uttered by the user, and match them with "on," which is an operator of the action. In addition, the operator set 141b may store various morphemes, such as "off," "turn off," "end," etc., which can be uttered by the user, by matching them with the operator "off."

The object set 141c may store various morphemes, such as "aircon" and "air conditioner" that the user can utter with the "aircon" object of the action. In addition, various morphemes that can be uttered by the user, such as "defog" and "defogging," can be stored by matching them with the action object "defog."

The natural language understanding portion 111b determines the operator and the object stored in the domain/action inference rule DB 141 based on at least one of the domain, the entity name, the speech act, or the user's intention to speak and extracts the action corresponding to the determined operator and the determined object.

Referring back to FIG. 4, the natural language understanding portion 111b may extract parameters related to performing an action. The parameters related to performing the action may be valid parameters directly required to perform the action, or may be invalid parameters used to extract such valid parameters.

For example, the natural language understanding portion 111b may extract "turn on the air conditioner" as a condition parameter from the user's utterance $U_1$ illustrated in FIG. 3. The natural language understanding portion 111b may extract "set temperature" as a result parameter from the user's utterance $U_1$ illustrated in FIG. 3. The natural language understanding portion 111b may extract "17 degrees" as a reference parameter from the user's utterance $U_1$ illustrated in FIG. 3.

The natural language understanding portion 111b may extract a tool configured to express a relationship between words or between sentences, e.g., parse-tree.

The morphological analysis result, the domain information, the action information, the speech act information, the extracted parameter information, the entity name information and the parse-tree, which are included in the processing result of the natural language understanding portion 111b may be transmitted to the dialogue input manager 111c.

For example, the natural language understanding portion 111*b* may use "alter_user rule" as the action, "on_aircon" as the condition parameter, "mod_aircon" as the result parameter, and "17 degrees" as the reference parameter in the user's utterance $U_1$ shown in FIG. 3, and transmit the extracted information to the dialogue input manager 111*c*.

Meanwhile, the context information processor 112 may collect context information from the information except for the speech input device 220 and the hardware devices provided in the vehicle 200, and may understand the context based on the collected context information.

When the context information processor 112 does not understand the intention to change or generate the user rule in the explicit speech of the user, the context information processor 112 may additionally collect context information and try to understand the intention of the user clearly.

Alternatively, the context information processor 112 may generate and change the user rule through the context information without the user's explicit speech. For example, the context information processor 112 may grasp the intention of generating the user rule through an interface for generating the user rule through the input button 221.

Figure 6:
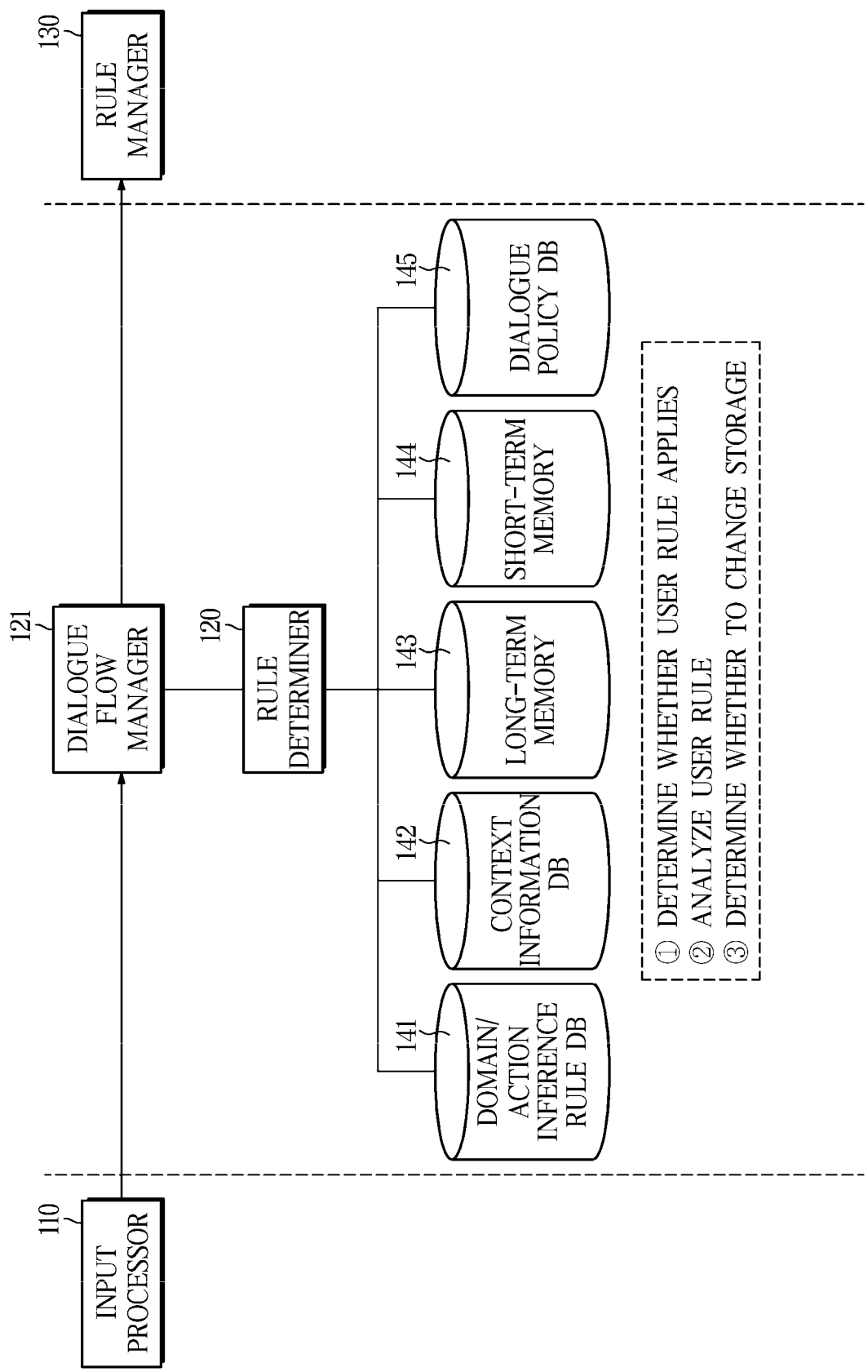
FIG. 6 is a control block diagram for illustrating a rule determiner.
Figure 7:
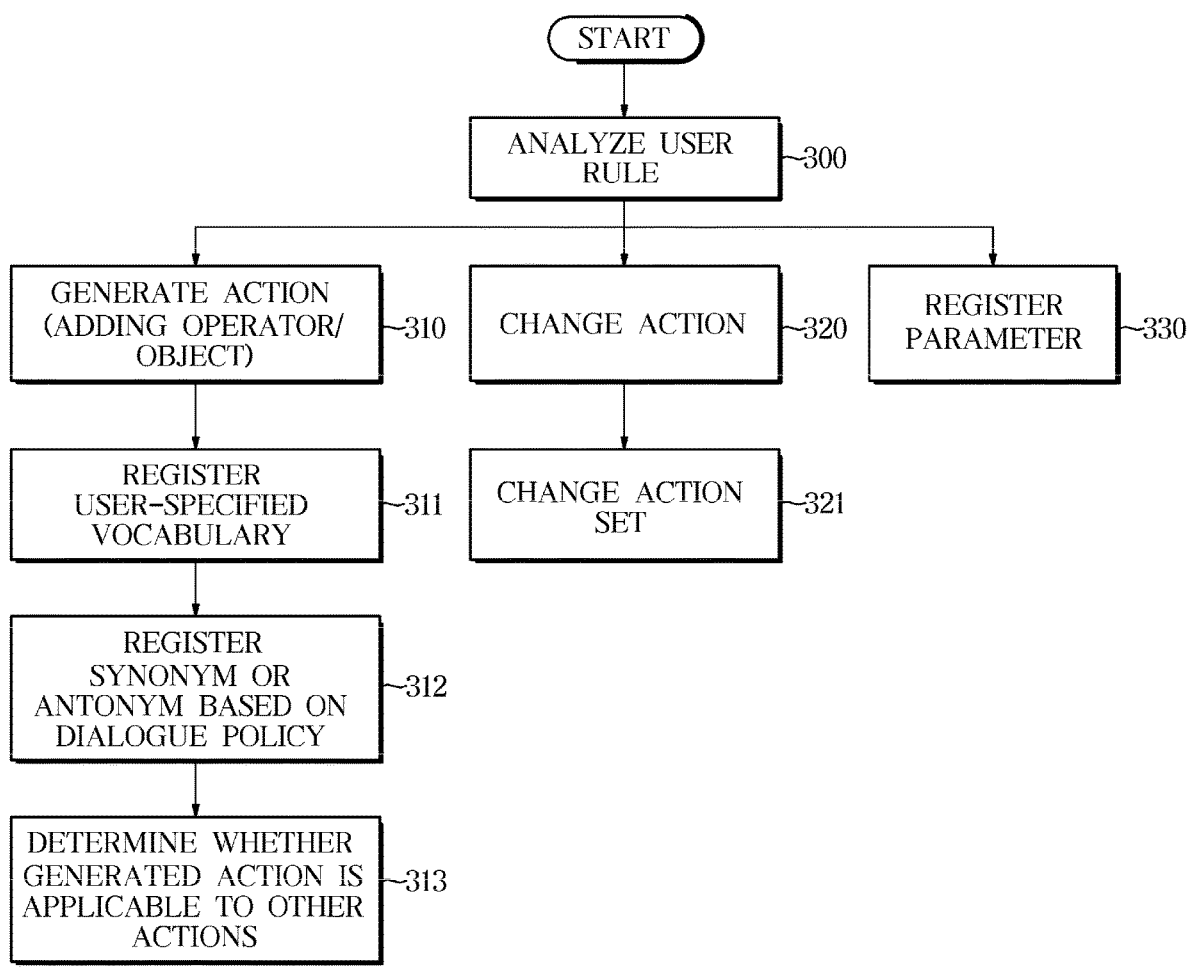
FIG. 7 is a flowchart illustrating various embodiments for a rule determiner to apply a user rule.

FIG. 6 is a control block diagram for illustrating a rule determiner. FIG. 7 is a flowchart illustrating various embodiments for a rule determiner to apply a user rule.

The input processor 110 determines the user's intention with respect to the user rule and transmits the result of determination to a dialogue flow manager 121. The dialogue flow manager 121 establishes a dialogue policy in response to the current user's utterance.

The dialogue flow manager 121 may determine that the current user's utterance is about the user rule. The dialogue flow manager 121 transmits the transmitted information to the rule determiner 120. That is, the rule determiner 120 is a configuration of the dialogue manager in which the disclosed dialogue system 100 generates a dialogue according to the processing result of the input processor 110.

Referring to FIG. 6, the rule determiner 120 analyzes the user rule that the user wants to create or change.

Specifically, the rule determiner 120 determines whether the ground rule stored in the storage 140 and the user rule input by the user collide with each other by using information stored in at least one of the domain/action inference rule DB 141, the context information DB 142, the long-term memory 143, the short-term memory 144, or the dialogue policy DB 145 corresponding to an example of the storage 140.

For example, when the user wants to change the action of on_aircon to the action of mod_aircon as shown in the embodiment of FIG. 3, the user rule collides with mod_aircon, which is the existing stored ground rule.

When the user rule does not conflict with the ground rule, the rule determiner 120 determines that the user creates a new user rule.

The rule determiner 120 determines whether the user rule and the ground rule collide, and then determines whether the user rule is a rule that can be executed in the situation where the dialogue system 100 is applied.

Specifically, the rule determiner 120 determines whether to apply the ground rule or the user rule through the dialogue policy DB 145.

The dialogue policy DB 145 may store various dialogue situations, and criteria for change and importance may be stored for each of the ground rules. When the user tries to change the ground rule that cannot be changed, the rule determiner 120 determines that the received user rule cannot be executed.

In addition, the rule determiner 120 determines whether the user rule can be applied based on the context information stored in the context information DB 142.

For example, when the user wants to create a new user rule called "turn on shower," the rule determiner 120 checks whether the shower is provided in the vehicle 200 through the context information DB 142. If the shower is not provided in the vehicle 200, the rule determiner 120 may determine that the received user rule cannot be applied. In this case, the rule determiner 120 determines the user rule as an invalid rule.

If it is determined that the user rule is applicable, the rule determiner 120 determines the action and the parameter to change based on the received user rule.

The rule determiner 120 analyzes the object, the operator, and the parameter of the action included in the received user rule, and selects information to be updated in the storage 140. A detailed description thereof will be described later with reference to FIG. 7.

Referring to FIG. 7, the rule determiner 120 analyzes the user rule again (300).

The user rule transmitted from the input processor 110 may include a condition parameter, a result parameter, and a reference parameter. The rule determiner 120 analyzes each parameter and then determines the information of the storage 140 to be updated.

Specifically, the rule determiner 120 may update the storage 140 by generating an action (310), changing an action (320), or registering a parameter (330).

In connection with the generating of the action (adding an operator/object), the rule determiner 120 may register user-specified vocabulary (311). For example, the rule determiner 120 may create the user rule, "If I say 'jjong air conditioner', turn off the air conditioner." In this case, the rule determiner 120 may determine to update a new operator in at least one of the domain/action inference rule DB 141, the short-term memory 144, or the long-term memory 143.

The rule determiner 120 may register a synonym or an antonym based on the dialogue policy (312). For example, the rule determiner 120 may create the user rule, "If I say con from now on, recognize it as the air conditioner." In this case, while the rule determiner 120 registers "con" as a new object, the rule determiner 120 may also register "Coney," which may correspond to an synonym as the object. The rule determiner 120 may determine to register the object to be changed in at least one of the domain/action inference rule DB 141, the short-term memory 144, or the long-term memory 143.

The rule determiner 120 may determine whether the generated action is applicable to other actions based on the dialogue policy (313). For example, the rule determiner 120 may create the user rule, "If I say 'off all', turn off the air conditioner." The rule determiner 120 may determine whether it is applicable to another device of the vehicle 200 while modifying the action set related to the off_aircon.

In addition to generating the action, the rule determiner 120 may determine a change of the action (320). Specifically, the rule determiner 120 may change the ground rule included in the action set into the user rule (321).

For example, the rule determiner 120 may apply the user rule included in the embodiment of FIG. 3, "If I say turn on the air conditioner, set the temperature to 17 degrees." In this case, the rule determiner 120 may change the on_aircon stored in the action set to mod_aircon.

The rule determiner 120 may register a parameter with the action (330).

For example, the rule determiner 120 changes the mod_aircon according to the embodiment of FIG. 3 and stores the reference parameter corresponding to the set temperature, that is, "17 degrees" in the action set. When the reference parameter necessary for the action to be changed is included, the rule determiner 120 may change the reference parameter together with the action.

Referring back to FIG. 6, the rule determiner 120 specifically determines how to change the storage 140, and then transmits the determination result back to the dialogue flow manager 121.

The dialogue flow manager 121 determines a response to the user's utterance from the dialogue policy DB 145. The dialogue flow manager 121 transmits the result determined by the rule determiner 120 to the rule manager 130.

Figure 8:
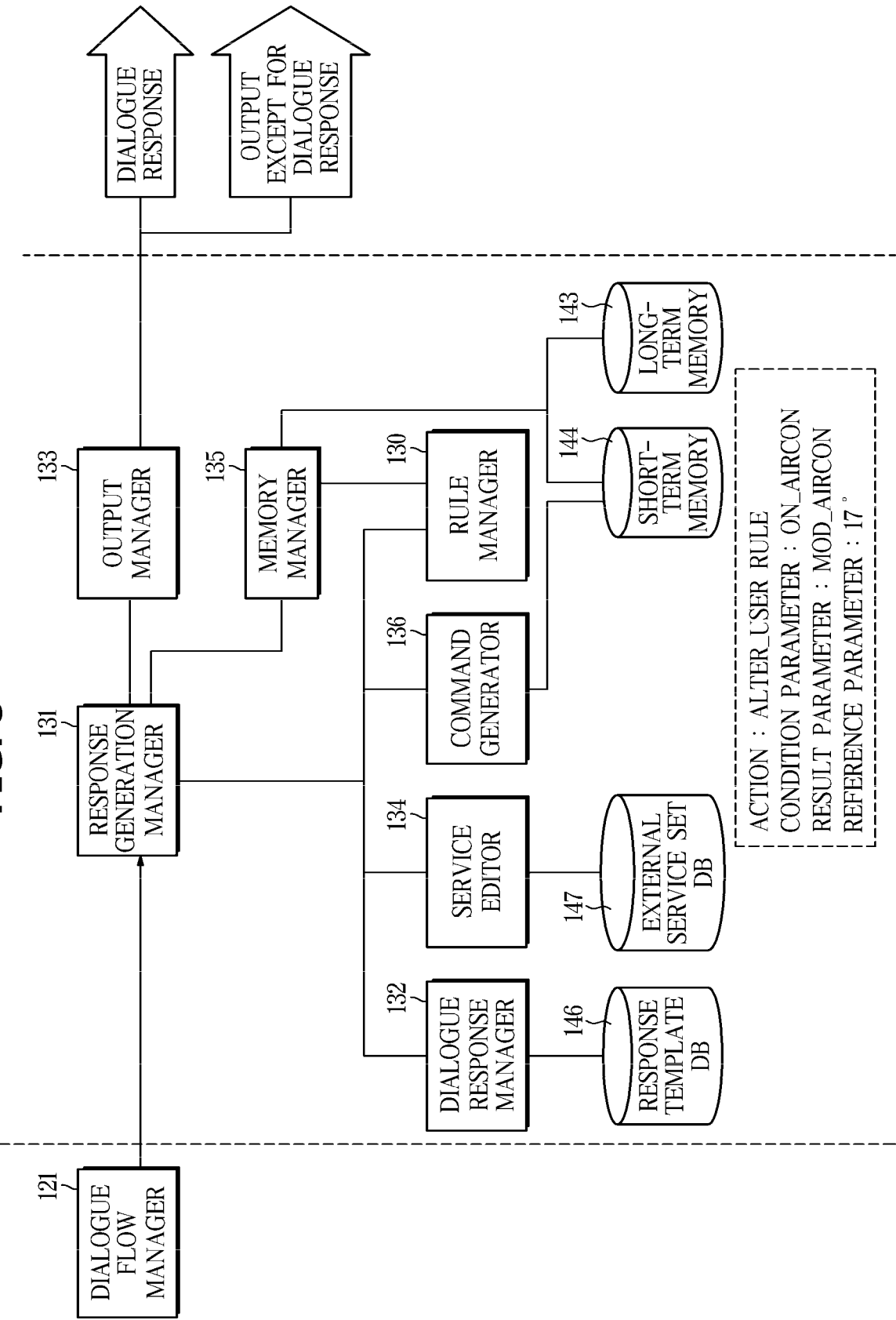
FIG. 8 is a control block diagram illustrating a rule manager.

FIG. 8 is a control block diagram illustrating a rule manager.

The dialogue flow manager 121 transmits the determination result of the rule determiner 120 to a response generation manager 131.

The response generation manager 131 generates a dialogue response required to perform the action transmitted by the dialogue flow manager 121, that is, the action related to the user rule. The generated dialogue response is output as the dialogue response and an output except for the dialogue response through an output manager 133.

Specifically, the response generation manager 131 may include a dialogue response generator 132 generating a text type response, an image type response, or an audio type response for a response to the user's utterance; a service editor 134 sequentially or sporadically executing a plurality of services and collection results thereof to provide a service desired by the user; a command generator 136 generating a command for controlling the vehicle or a command for providing the service using external content; and a memory manager 135 managing the long-term memory 143 and the short-term memory 144 based on the output of the output manager 133.

The dialogue response generator 132 may extract the dialogue policy by searching the response template 146, and generate the dialogue response by filling a parameter required for an extracted dialogue response form. For example, based on the determination result of the rule determiner 120 that the user rule may be applied in the embodiment of FIG. 3, the dialogue response generator 132 may generate "Yes" in the response template 146. The generated dialogue response is transmitted to the response generation manager 131.

The command generator 136 generates a command for the service when the user's utterance is related to the service provided by the dialogue system 100.

For example, if the user rule is a rule related to a controlling method of air conditioning, the service editor 134 may generate a command for controlling the air conditioner provided in the vehicle 200. Instructions generated by the command generator 136 may be stored in the short-term memory 144 and deleted from the short-term memory 144 when a predetermined time elapses.

The service editor 134 may be involved in executing the plurality of services sequentially or sporadically when the user rule determined by the rule determiner 120 is related to the plurality of services provided by the dialogue system 100. The result executed by the service editor 134 may be stored in the external service set DB 147.

The rule manager 130 may update a memory to apply the determination result of the rule determiner 120.

According to a request of the response generation manager 131, the rule manager 130 may store the user rule determined by the rule determiner 120 in the short-term memory 143. In addition, the rule manager 130 may edit at least one of the response template 146, the external service set DB 147, or the short-term memory 144.

For example, in the embodiment of FIG. 3, the rule manager 130 may store the condition parameter, the result parameter, and the reference parameter while storing the user rule including an action called alter_user rule in the long-term memory 143. The rule manager 130 may change a command related to on_aircon to a command related to mod_aircon as the condition parameter, and add a command for setting the set temperature of the air conditioner to 17 degrees. In addition, the rule manager 130 may update the response template 146 to generate a dialogue response of "Yes, the temperature of the air conditioner would be adjusted to 17 degrees," when the corresponding user rule is input again.

The memory manager 135 manages the long-term memory 143 and the short-term memory 144 based on the contents received from the response generation manager 131 and the output manager 133. For example, the memory manager 135 may update the short-term memory 144 by storing the conversation contents between the user and the system based on the generated and outputted dialogue response, and may obtain user-related information collected through the conversation content. The long-term memory 143 may be updated by storing the same.

The memory manager 135 analyzes the data accumulated for a predetermined period of time, obtains persistent information and stores the persistent information in the long-term memory 143 again. In the long-term memory 143, a location in which the persistent data is stored may be different from a location in which the data stored in a log file type is stored.

The memory manager 135 may determine persistent data among data stored in the short-term memory 144 and move and store the determined data to and in the long-term memory 143.

The output manager 133 may determine an output timing, an output sequence and an output position of the dialogue response generated by the dialogue response generator 132 and the command generated by the command generator 136.

The output manager 133 may output a response by transmitting the dialogue response generated by the dialogue response generator 132 and the command generated by the command generator 136 to an appropriate output position at an appropriate order with an appropriate timing. The output manager 133 may output a Text to Speech (TTS) response via the speaker 232 and a text response via the display 231. When outputting the dialogue response in the TTS type, the output manager 133 may use a TTS module provided in the vehicle 200 or alternatively the output manager 133 may include the TTS module.

Meanwhile, each of the configurations described with reference to FIGS. 4, 6, and 8 may be implemented by a single processor or may be implemented by separate processors. In addition, the input processor 110, the rule determiner 120, and the rule manager 130 may also be implemented by a single processor or may be implemented by separate processors.

Figure 9:
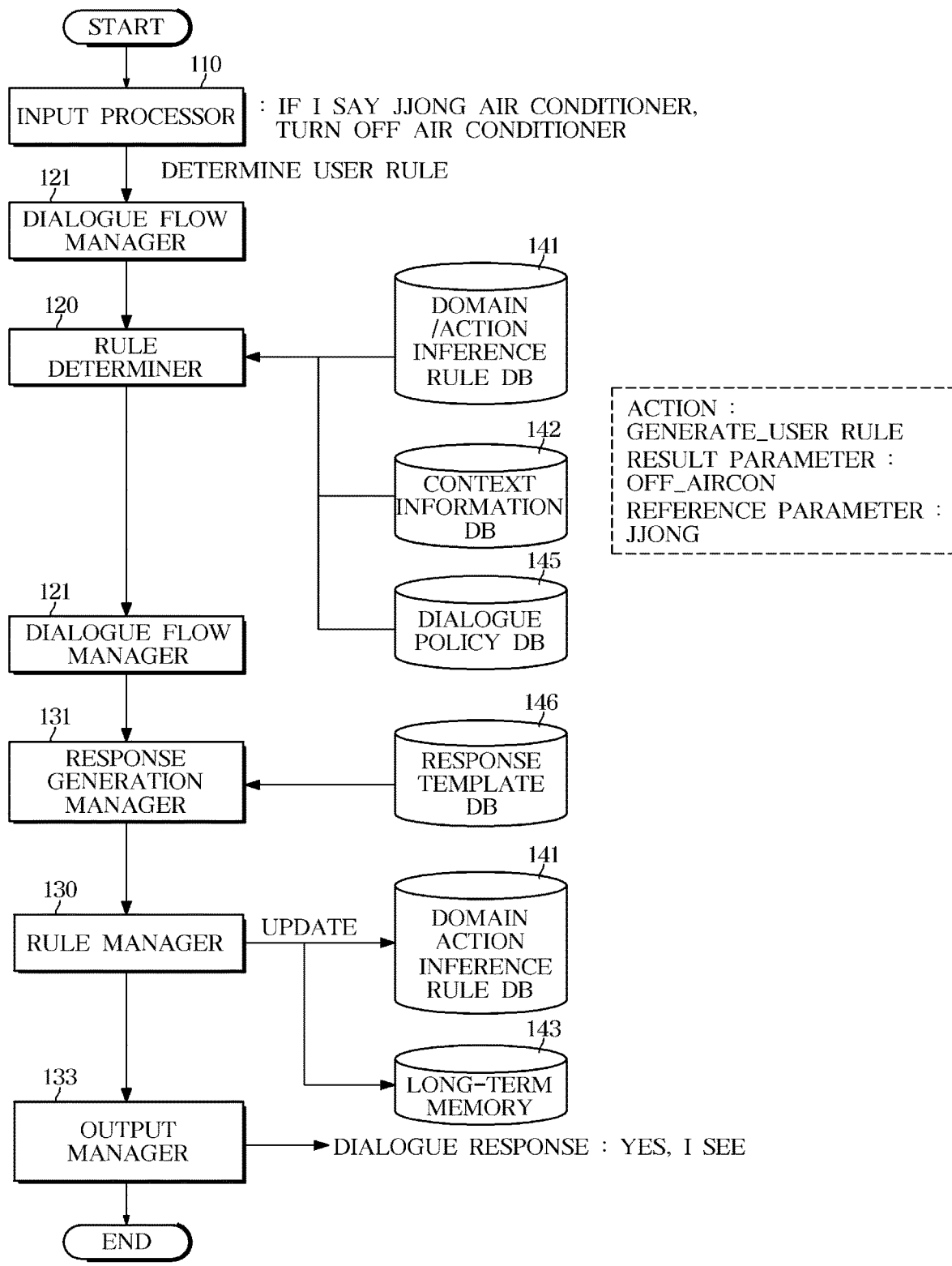
FIG. 9 is a flowchart of another embodiment of creating a new user rule.

FIG. 9 is a flowchart of another embodiment of creating a new user rule.

Referring to FIG. 9, the input processor 110 may receive an utterance from the user, "If I say 'jjong air conditioner', turn off the air conditioner." The input processor 110 may analyze the morpheme of the received utterance and determine the domain as the user rule. The input processor 110 analyzes the speech act as a request.

The input processor 110 may extract a "generate_user rule" from the user's utterance based on the above-described analysis result. The input processor 110 may extract "off_aircon" as a result parameter and "jjong" as a reference parameter.

The input processor 110 transmits the extracted action and the plurality of parameters to the dialogue flow manager 121.

The dialogue flow manager 121 establishes the dialogue policy to respond to the user's utterance. The dialogue flow manager 121 confirms that the current user's utterance is related to the user rule, and transmits the extracted action and the parameters to the rule determiner 120.

The rule determiner 120 determines whether the user rule conflicts with the ground rule based on information included in at least one of the domain/action inference rule DB 141, the context information DB 142, or the dialogue policy DB 145.

Specifically, the rule determiner 120 may confirm from the domain/action inference rule DB 141 that the ground rules do not conflict with the received user rules. The rule determiner 120 may determine from the context information DB 142 that the dialogue system 100 is provided in the vehicle 200, and that the user rule regarding the controlling method of the air conditioner may be applied. In addition, the rule determiner 120 may determine from the dialogue policy DB 145 that the reference parameter "jjong" may be applied.

When it is determined that the received user rule is applicable, the rule determiner 120 analyzes the received user rule and determines specific information for updating the storage 140.

In the disclosed embodiment, the rule determiner 120 may analyze that the received user rule is the user rule that adds a new operator. The rule determiner 120 may change the operator set of the domain/action inference rule DB 141 to add a new vocabulary word "jjong" and may decide to store the user rule input in the long-term memory 143. The rule determiner 120 transmits the determination result to the dialogue flow manager 121.

The dialogue flow manager 121 establishes the dialogue policy to generate the dialogue response corresponding to the determination result of the rule determiner 120. The dialogue flow manager 121 transmits the determination result of the rule determiner 120 and the established dialogue policy to the response generation manager 131.

The response generation manager 131 may select "Yes, I see" from the response template 146 according to the established conversation policy. In addition, the response generation manager 131 transmits the determination result of the rule determiner 120 to the rule manager 130.

The rule manager 130 updates the domain/action inference rule DB 141 to add a new operator "jjong," and adds information about the new user rule to the long-term memory 143.

The response generation manager 131 may monitor the operation of the rule manager 130 and output the selected response through the output manager 133, that is, "Yes, I see."

The disclosed dialogue system and dialogue processing method perform dialogue beyond a predetermined dialogue pattern, and provide the dialogue system capable of providing an extended function to the user by registering new vocabulary that matches the user's preference and by changing a pre-stored conversation pattern. In addition, the dialogue system and dialogue processing method may improve the loyalty of the service and increase the user's convenience by increasing the user's satisfaction.

What is claimed is:

1. A dialogue system comprising:
   a microphone configured to receive a user's utterance;
   a processor configured to:
      determine that the user's utterance is an utterance asking a change of a predetermined ground rule in response to determining that a condition parameter including "if" and a result parameter including "set" are included in the user's utterance received by the microphone; and
      in order to change the predetermined ground rule, set the condition parameter in the user's utterance as a user's utterance command, and set the result parameter as a command for controlling a device corresponding to the user's utterance command; and
   a storage configured to store information related to the condition parameter and the result parameter set based on the predetermined ground rule;
   wherein the processor is configured to, in response to determining that the condition parameter is included in the user's utterance received by the microphone, extract the condition parameter, identify the result parameter corresponding to the extracted condition parameter based on the information in the storage, generate a response based on the identified result parameter, transmit the command for controlling the device based on the identified result parameter, and output the generated response to a speaker.

2. The dialogue system according to claim 1, wherein the processor determines whether the ground rule previously stored in the storage and the change of the predetermined ground rule collide with each other.

3. The dialogue system according to claim 2, wherein the processor determines whether the change of the predetermined ground rule is applicable based on at least one of context information or a dialogue policy included in the storage.

4. The dialogue system according to claim 3, wherein the processor determines the update of the storage based on a determination result of a collision and a determination result of the applicability.

5. The dialogue system according to claim 1, wherein the processor registers a synonym or an antonym related with the condition parameter or the result parameter to the storage based on a dialogue policy.

6. The dialogue system according to claim 1, wherein the processor is configured to generate the response to the user's utterance based on a determination result of whether the change of the predetermined ground rule is applicable.

7. A method of controlling a dialogue system comprising,
   receiving a user's utterance from a microphone;
   determining, by a processor, that the user's utterance is an utterance asking a change of a predetermined ground rule in response to determining that a condition parameter and a result parameter are included in the user's utterance received by the microphone;
   in order to change the predetermined ground rule, setting, by the processor, the condition parameter in the user's utterance as a user's utterance command, and setting the result parameter as a command for controlling a device corresponding to the user's utterance command;
   storing, by the processor, information related to the condition parameter and the result parameter set based on the predetermined ground rule;

in response to determining that the condition parameter is included in the user's utterance received by the microphone, extracting, by the processor, the condition parameter;

identifying, by the processor, the result parameter corresponding to the extracted condition parameter based on the information in a storage;

generating, by the processor, a response based on the identified result parameter;

transmitting, by the processor, the command for controlling the device based on the identified result parameter; and outputting the generated response to a speaker.

8. The method of controlling the dialogue system according to claim 7, wherein the determining comprises:

determining whether a ground rule previously stored in the storage and the change of the predetermined ground rule collide with each other.

9. The method of controlling the dialogue system according to claim 8, wherein the determining comprises:

determining whether the change of the predetermined ground rule is applicable based on at least one of context information or a dialogue policy.

10. The method of controlling the dialogue system according to claim 9, wherein the determining comprises:

determining the update of the storage based on a determination result of a collision and a determination result of the applicability.

11. The method of controlling the dialogue system according to claim 7, wherein the managing comprises:

registering a synonym or an antonym related with the condition parameter or the result parameter to the storage based on a dialogue policy.

12. The method of controlling the dialogue system according to claim 7, further comprising:

generating a response to the user's utterance based on a determination result of whether the change of the predetermined ground rule is applicable.

\* \* \* \* \*